United States Patent [19]

Meyer

[11] Patent Number: 4,915,413

[45] Date of Patent: Apr. 10, 1990

[54] THREE-POINT SAFETY RESTRAINT SYSTEM WITH SHOULDER BELT QUICK DISCONNECT

[75] Inventor: Christopher D. Meyer, Sterling Heights, Mich.

[73] Assignee: Allied-Signal, Inc., Morris Township, Morris County, N.J.

[21] Appl. No.: 289,631

[22] Filed: Dec. 22, 1988

[51] Int. Cl.⁴ .............................................. B60R 22/18
[52] U.S. Cl. ..................................... 280/801; 24/628; 280/808; 297/483
[58] Field of Search ................ 280/801, 808; 297/483, 297/468, 485; 24/630, 631, 633, 628, 701, 573, 574

[56] References Cited

U.S. PATENT DOCUMENTS

| | | | |
|---|---|---|---|
| 2,256,068 | 9/1941 | Voster | 24/628 |
| 2,640,246 | 6/1953 | Shomber | 24/628 |
| 3,600,768 | 8/1971 | Romanzi, Jr. et al. | 24/574 |
| 3,626,556 | 12/1971 | Struck | 24/633 |
| 3,885,811 | 5/1975 | Takada | 24/628 |
| 4,129,321 | 12/1978 | Garvey | 280/801 |
| 4,702,491 | 10/1987 | Meyer | 280/808 |

Primary Examiner—Richard A. Bertsch

[57] ABSTRACT

An interlock mechanism for a three-point safety restraint system comprising a tongue plate having a pair of intersecting openings of dissimilar diameters, the point of intersection defining a narrow passage, a connector plate assembly adapted to be connected to the tongue plate having a two tier shoulder rivet including an enlarged head portion having a diameter smaller than the larger opening and larger than the smaller opening. The rivet further including a circular boss formed on the underside of the head portion having a diameter slightly smaller than the smaller opening and larger than the diameter of the passage. A spring having one end in engagement with the connector plate and having its other end in engagement with a flat faced spring retainer, the spring and spring retainer urging the tongue plate and connector plate in compressive engagement when such plates are in a locked position with the rivet centered about the smaller of the two openings.

5 Claims, 3 Drawing Sheets

THREE-POINT SAFETY RESTRAINT SYSTEM WITH SHOULDER BELT QUICK DISCONNECT

BACKGROUND AND SUMMARY OF THE INVENTION

The present invention generally relates to a quick disconnect mechanism usable with a three-point safety restraint system for automotive vehicles. The present invention is usable generally with all passenger vehicles but finds specific application with passenger vans that are convertable to cargo vans. The conversion of a passenger van to a cargo van requires the removal of the rear seats. It is desirable that upon removal of these rear seats that the passenger restraint or seat belt mechanisms are removed with the seat or automatically stored so as not to hinder the operator as cargo is moved into and out of the van.

It is an object of the present invention to provide a three-point safety restraint system wherein the shoulder belt is easily disconnectable from a lap belt. A further object of the present invention is to provide a quick disconnect mechanism to permit the interconnection between the shoulder belt and the lap belt.

Accordingly the invention comprises: A safety restraint system comprising a first retractor mechanism adapted to be attached to the roof of a vehicle; and a first webbing extendable therefrom; a second retractor mechanism adapted to be mounted to a seat and a second webbing extendable therefrom; a buckle assembly adapted to be mounted to the seat at a location generally opposite from the second retractor mechanism. The system also includes a seat belt interlock mechanism comprising: connector assembly means, adapted to be connected to the first webbing for permitting a snap-lock engagement of the connector assembly means to a tongue plate, adapted to be connected to the second webbing, the tongue plate comprising a composite opening formed by two overlapping open areas of dissimilar diameters commonly linked through a narrow passage. The connector assembly comprises a connector plate and a two-tier rivet means, extending therefrom, for affecting such snap lock engagement including a boss movable in a first direction through the composite opening to a first position and movable along second direction, generally perpendicular to the first direction to a second position, to place the boss portion below the smaller of the two openings, a head portion, movable with the boss, receivable through the larger of the two openings having a diameter greater than that of the smaller opening and spring biased retainer means for applying a force to one surface of the tongue plate to urge or snap the boss into engagement with the smaller opening and to urge a portion of the head portion into engagement with an opposite surface of the tongue plate.

Many other objects and purposes of the invention will be clear from the following detailed description of the drawings.

DETAILED DESCRIPTION OF THE INVENTION

Figure 1:
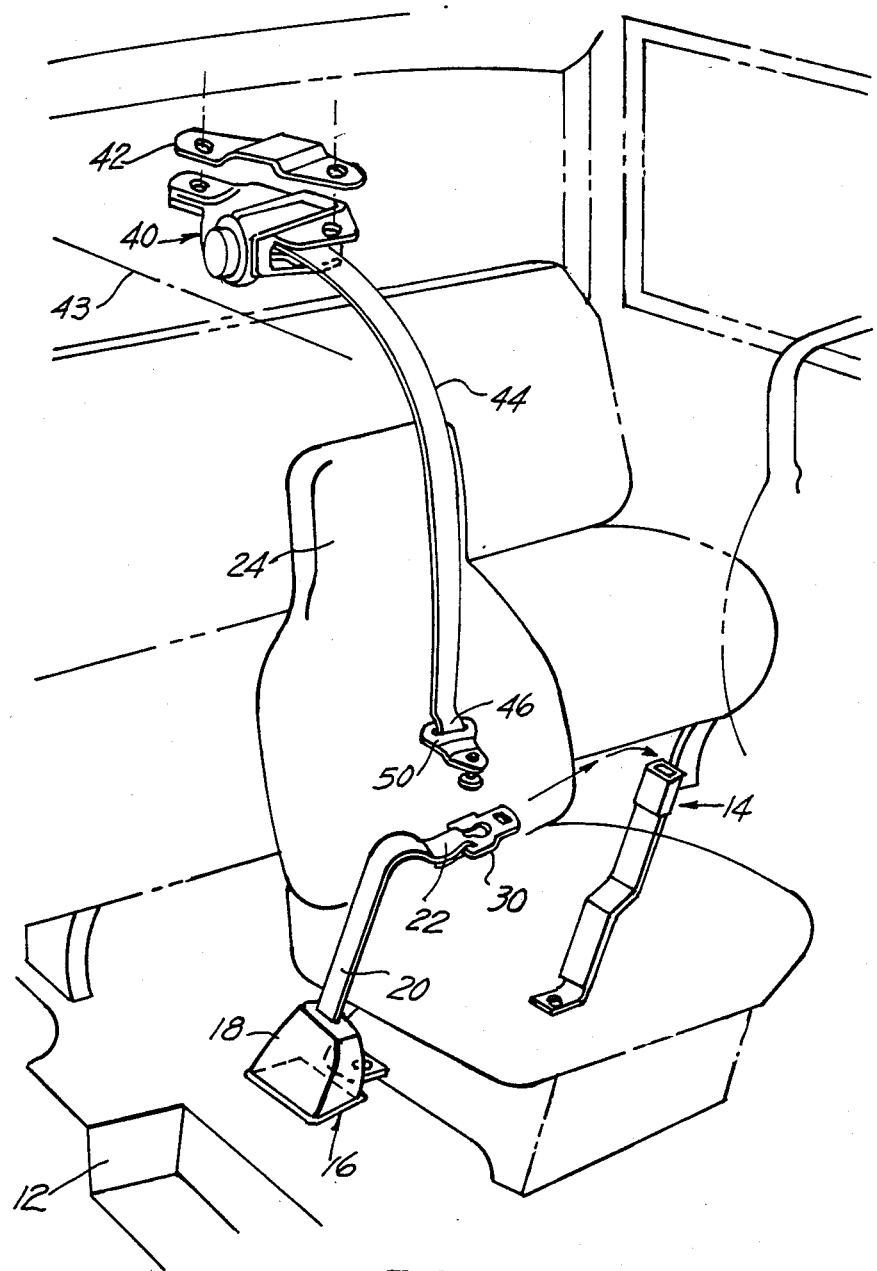
FIG. 1 is a projected view of a rear outboard seat of a motor vehicle utilizing the present invention.

FIG. 1 illustrates an exemplary seating arrangement found in many passenger vans. More specifically there is illustrated a seat 10 which is representative of a captain's chair situated behind the front passenger seat and adjacent a side entry door. While a captain's chair is illustrated, the following description is equally applicable to a bench sat. The seat 10 is positioned next to the entry way formed by the sliding side door of the van. As mentioned above, from time to time, it may be desirable to remove the passenger seats from the van so as to use the remaining area for cargo storage. The seat illustrated in FIG. 1 is secured via a seat frame 12 to the vehicle frame or floor by bolts or the like which are not shown. Attached to the vehicle frame 12 along one side thereof is a receptacle or seat belt buckle 14. Attached to the opposite side of the seat frame 12 is secured a retractor mechanism 16. Positioned internally to the cover 18 of the retractor mechanism is a spool (not shown). Extending from the spool and cover 18 is a webbing or lap belt 20. The cooperation between the lap belt 20 and the internal mechanisms of the retractor 16 are well known in the art and not described herein. Attached to an end 22 of the lap belt is a tongue mechanism 30 which will be described in greater detail later. The tongue mechanism is adapted to fit within the buckle 14 in a known manner to secure the occupant therein.

Positioned above and slightly behind the back 24 of the seat 10 is a second retractor mechanism 40. Functionally this retractor mechanism can be identical to retractor 16. The retractor 40 differs from retractor 16 in that it is adapted to be mounted via a bracket 42 to the roof 43 (shown in phantom line) of the van. Extending from the retractor 40 is another webbing or shoulder belt generally shown as 44. Attached to an end 46 of the shoulder belt 44 is a connector plate 50 which is adapted to fit within a portion of the tongue 30 to provide a three-point seat belt system. As illustrated the three points for securing an occupant to the seat 10 are the retractor 16, the receptacle or buckle 14 and the second retractor 40. In operation the occupant will pull the webbing or shoulder belt 44 from the retractor 40 and insert the connector plate 50 into the tongue 30. Thereafter the lap belt and shoulder belt are pulled such that the tongue 30 is inserted within the buckle securing the occupant to the seat.

When it is desired to remove the seat from the van, the connector plate 50 is disengaged from the tongue 30 thereby permitting the shoulder belt to retract and be stored proximate the roof 43 of the vehicle. Thereafter the seat 10, the buckle 14 and retractor (16) which are attached thereto are removed leaving a non-obstructed area for cargo.

The connector plate assembly 60 further includes a resilient member such as spring 91 received about the stem 78 and a washer-like spring retainer 93 slidably received about the stem 78. As can be seen from FIG. 2, the spring 90 biases the spring retainer 92 away from the connector plate 50.

Figure 2:
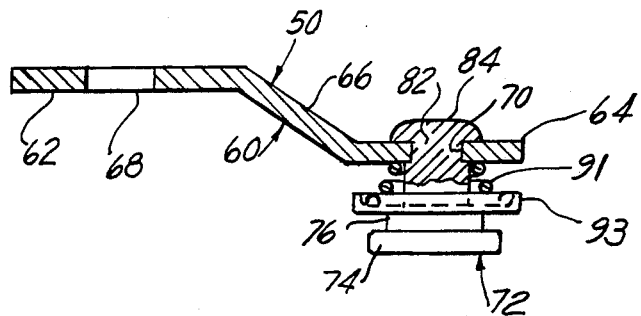
FIG. 2 is a cross-sectional view of a connector plate assembly.

Reference is now made to FIGS. 2-6. FIG. 2 illustrates a cross-sectional view of a connector plate assembly generally shown as 60. This assembly 60 includes the connector plate 50 having a bent shape such that one end 62 is elevated relative to its opposite end 64. A transition surface 66 is fabricated proximate the middle of the connector plate 50. Proximate the end 62 is an opening 68 for receipt of the shoulder belt 44 as illustrated in FIG. 1. The connector plate further includes a small opening 70 proximate end 64. Attached to the connector plate 50 is a two-tier rivet generally shown as 72. The rivet 72 comprises a large diameter head portion 74, a smaller diameter circular boss 76 and a shaft 78. The shaft 78 terminates at a shoulder and narrow portion 82 which is received within the opening 70. The two-tier rivet 72 is secured at end 84 to the connector plate 50 in a known manner.

Figure 3:
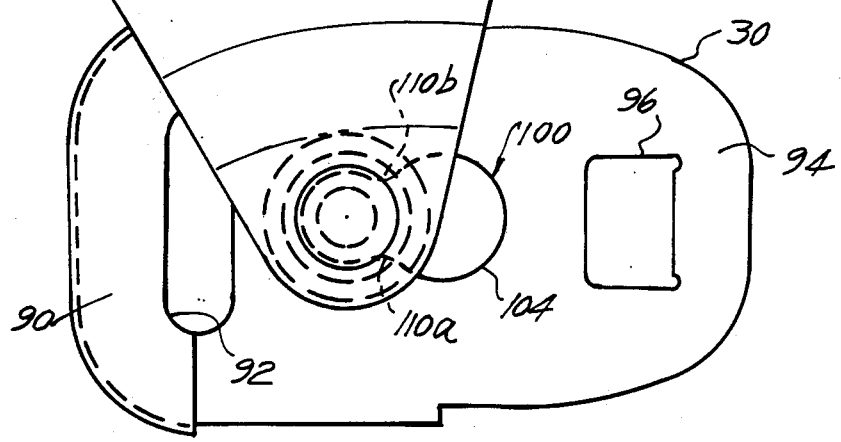
FIG. 3 is a plan view of a connector plate assembly and tongue mechanism constructed in accordance with the present invention.

FIG. 3 illustrates the connector plate assembly in mating engaging with the tongue 30. The tongue 30, proximate an end 90, includes an opening 92 for receipt of the lap belt 22 (see FIG. 1). Proximate an end 94 is a generally rectangular opening 96 adapted to be secured within a retention mechanism of known construction within the buckle 14. Situated between the openings 92 and 96 is a composite opening 100 generally shaped as a "FIG. 8". The composite opening 100 is formed of two intersecting, generally circular openings 102 and 104. The points of intersection of the circular openings 102 and 104 are shown as 110a and 110b respectively. The connector plate assembly 60 shown in FIG. 3 is rotated relative to the tongue 30.

Figure 4:
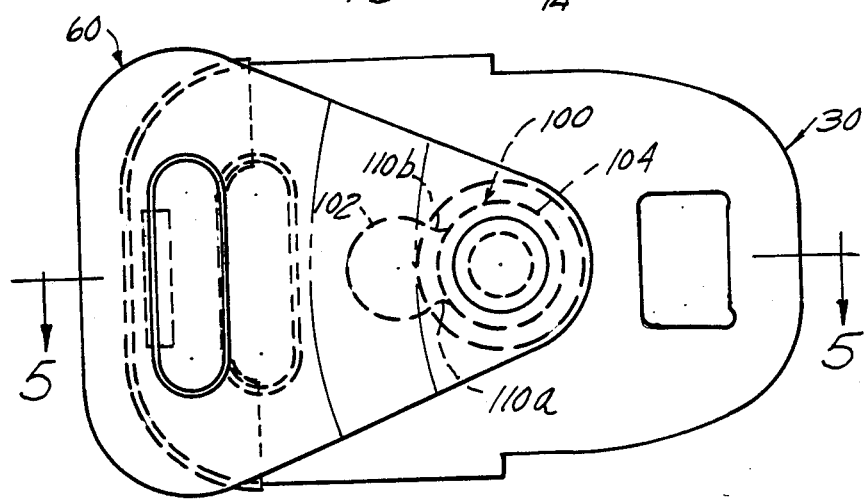
FIG. 4 illustrates another plan view of the connector plate assembly and tongue.

For ease in illustrating various cross-sectional views, FIG. 4 has been used which is essentially identical to FIG. 3, however, the connector plate assembly 60 has been rotated to be generally colinear with the tongue 30.

Figure 5:
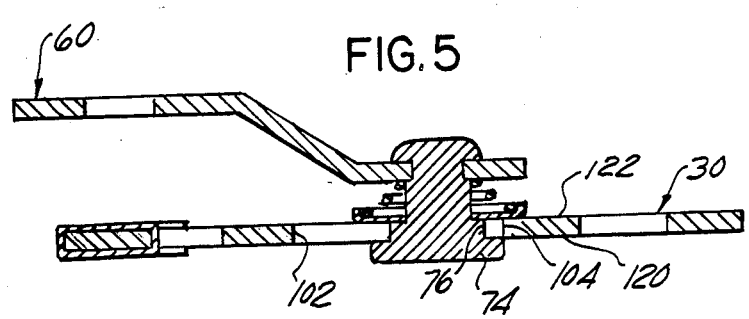
FIG. 5 illustrates a cross-sectional view taken through section 5—5 of FIG. 4.

As mentioned above, to engage the shoulder belt 44 to the seat belt 20, the occupant will selectively mate the connector plate 50 to the tongue 30. FIG. 5 is illustrative of the condition wherein the occupant has inserted the head portion 74 of the connector plate assembly within the larger opening or portion of the composite opening 104 within the tongue 30. In this unstressed position, the head 74 protrudes somewhat below a lower surface 120 of the tongue 30 and the spring retainer gently engages a top surface 122. Preferably the diameter of the head 74 is made slightly smaller than the diameter of the opening 104. Further, in this position the boss 76 is positioned generally within the thickness of material forming the tongue 30. The diameter of the boss 76 is chosen to be greater than the diameter or distance between the intersection points 110a and b of the openings 104 and 102. Consequently, in the position shown in FIG. 5 it is not possible to slide the connector assembly toward the smaller opening 102 since the boss 76 cannot fit through the intersection points 110.

Figure 6:
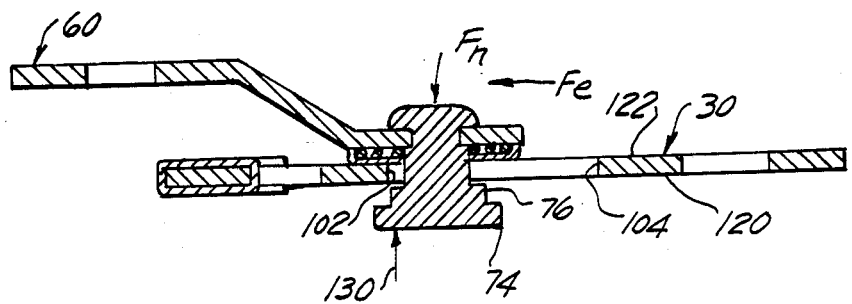
FIG. 6 illustrates substantially the same cross-sectional view shown in FIG. 5 with the connector plate assembly compressively engaging the tongue.

The engagement of the connector plate assembly 60 to the tongue 30 is accomplished as follows: A compressive or normal force $F_n$ is applied generally perpendicularly to the surface 120 of the tongue. This force will compress the spring 91 urging the boss 76 below the surface 120. Thereafter or simultaneously with the application of the compressive force, the operator will slide the connector plate assembly to the left, as shown in the drawings, by the application of a longitudinal force $F_1$ to permit the narrow diameter stem 78 to slide between the points of intersection 110a and b thereby moving the connector plate assembly to the position as illustrated in FIG. 6. In this position the boss 76 is generally below the opening 102. The final action is to remove the above forces by releasing the connector plate assembly. At this time the spring 91 will cause the spring retainer 93 to urge the connector plate 50 and tongue 30 apart thereby, in a relative manner, lifting the boss 76 into the opening 102. This final condition is not illustrated in FIG. 6, however, arrow 130 is used to indicate the final relative upward motion of the boss 76. In this mated condition the head 74 in concert with the spring retainer 91 prevent further movement of the two-tier rivet 72 thereby maintaining a locked or mated condition.

Many changes and modifications in the above described embodiment of the invention can, of course, be carried out without departing from the scope thereof. Accordingly, that scope is intended to be limited only by the scope of the appended claims.

I claim:

1. A seat belt interlock mechanism comprising:
    a tongue plate, adapted to be secured to a first seat belt at a first end thereof, including a second end formed as a tongue adapted to be securely received within a buckle assembly; the tongue plate, between the first and second ends, including intersecting or overlapping first and second openings of dissimilar diameters, the points of intersection of the openings having a diameter smaller than the diameter of either of the two openings, the diameter of the first opening being larger than the diameter of the second opening;
    a connector plate assembly moveable relative to the tongue plate between unlocked and locked positions comprising a connector plate adapted to be connected to a second seat belt at one end thereof, comprising:
    a two tier shoulder rivet including an enlarged head portion having a diameter capable of being received within the first opening, a circular boss formed on one side of the head portion having a diameter larger than the diameter of the second opening and the distance between the points of intersection, but smaller than the head portion,
    a shaft portion, extending from the boss, having a diameter smaller than the diameter across the points of intersection of the first and second openings, and adapted to be attached proximate an opposite second end of the connector plate,
    a spring retainer, loosely received upon the shaft portion, having a flat engagement surface the outer diameter of which is greater than that of the first opening to frontally engage a flat surface of the tongue plate upon initial insertion of the rivet into the first opening and to provide for a flat slideable engagement therebetween as the connector plate is moved into the locked position, with the boss engaging the second opening; and bias means, for urging the spring retainer toward engagement with the boss when in an unlocked position and for urging the spring retainer into the tongue plate when in the locked position.

2. The mechanism as defined in claim 1 wherein the connector plate assembly is secured to the tongue as follows:

the head portion is placed within first opening with the spring retainer engaging a first surface of the tongue;

a compressive force is exerted perpendicular to the first surface compressing the bias means and permitting the head portion and boss of the two-tier rivet to be completely pushed through the first opening so as to be placed below an opposite second surface of the tongue, relatively simultaneously an axial second force is applied to permit the shaft portion to translate through the points of intersection to place the boss below the second opening, thereafter the forces are removed to permit the spring retainer to pull the boss into the second opening securing the connector plate assembly to the tongue.

3. The mechanism as defined in claim 1 wherein the bias means is a coil spring.

4. The mechanism as defined in claim 3 wherein the retainer further includes a side wall extending upwardly from the flat engagement surface for receiving a coacting end of the spring.

5. The mechanism as defined in claim 4 wherein the spring retainer is metal.

* * * * *